(12) United States Patent
Lee

(10) Patent No.: US 6,418,330 B1
(45) Date of Patent: Jul. 9, 2002

(54) DEVICE AND METHOD FOR GENERATING VARIOUS RING TONES IN RADIO TERMINAL

(75) Inventor: Hyeon-Woo Lee, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/152,594

(22) Filed: Sep. 14, 1998

(51) Int. Cl.[7] .................................................. H04B 1/38
(52) U.S. Cl. ........................ 455/567; 455/418; 455/419
(58) Field of Search ................................. 455/418, 419, 455/567, 564; 379/373, 374, 375

(56) References Cited

U.S. PATENT DOCUMENTS

| | | | | |
|---|---|---|---|---|
| 5,452,354 A | * | 9/1995 | Kyronlahti et al. | 379/373 |
| 5,481,599 A | * | 1/1996 | MacAllister et al. | 379/373 |
| 5,483,586 A | * | 1/1996 | Sussman | 379/201 |
| 6,018,654 A | * | 1/2000 | Valentine et al. | 455/419 |
| 6,058,171 A | * | 5/2000 | Hoopes | 379/142 |

FOREIGN PATENT DOCUMENTS

| | | | | |
|---|---|---|---|---|
| JP | 407222226 A | * | 8/1995 | H04Q/7/16 |
| JP | 409018551 A | * | 1/1997 | H04M/1/00 |

* cited by examiner

*Primary Examiner*—Melur Ramakrishnaiah
(74) *Attorney, Agent, or Firm*—Dilworth & Barrese, LLP

(57) ABSTRACT

A radio terminal which generates various, selectable ring tones suitable to the user's preference. A ring tone generating device includes a ring tone input device for receiving ring tones input from a user; a ring tone storage for storing the ring tones input from the ring tone input device; a ring tone generator for generating one of the ring tones stored in the ring tone storage, selected by the user, under the control of a controller; and the controller for generating the ring tone selected by the user through the ring tone generator, upon reception of an incoming call. The ring tone is any one of a voice, music and a sound.

6 Claims, 4 Drawing Sheets

PRIOR ART

DEVICE AND METHOD FOR GENERATING VARIOUS RING TONES IN RADIO TERMINAL

BACKGROUND OF THE INVENTION

1. Field of the Invention

The present invention relates to a radio terminal, and in particular, to a device and method for generating various ring tones in a radio terminal.

2. Description of the Related Art

A radio terminal, such as a cellular phone or a paging receiver, generates a ring tone (calling tone) or vibrates upon receipt of an incoming call to notify the user of the call receipt.

Referring to FIG. 1, a generally known radio communication system includes a calling (or originating) terminal 100, a wired exchange 110, a radio base station 120 and a called (or destination) radio terminal 130. In operation, the calling terminal 100 connects with the wired exchange 110 and inputs a phone number (or a unique number) of the radio terminal 130 to be called. The wired exchange 110 then analyzes the phone number received from the calling terminal 100 and calls the radio terminal 130 by way of the radio base station 120. In response to a received calling signal, the called radio terminal 130 will typically vibrate or generate an audible signal such as a specific ring tone, according to a vibration mode or a ring mode, to notify the user of the incoming call. In the ring mode, the called radio terminal 130 generates a ring tone which is preselected by the user, from a plurality of ring tones stored therein. Conventional radio terminals only store a limited number of selectable ring tones. Therefore, the user often cannot choose a ring tone suitable to his or her preference. In addition, since the conventional radio terminal has limited types of the ring tones, it is not unusual for one terminal to be set to generate the same ring tone as that of another terminal. In this case, when several users of radio terminals which are all set to the same ring tone are in close proximity to each other and one of the users is called, all the nearby users may believe that the ring tone is from their terminal.

Further, in the conventional radio terminal, all incoming calls generate the same ring tone, therefore, the user cannot determine the identity or priority of the calling party (caller) from the conventional ring tone.

SUMMARY OF THE INVENTION

It is therefore an object of the present invention to provide a device and method for generating various ring tones suitable to the user's preference in a radio terminal.

It is another object of the present invention to provide a device for generating a user input ring tone in a radio terminal.

It is further another object of the present invention to provide a method for downloading a ring tone from a database and generating the downloaded ring tone in a radio terminal.

It is still another object of the present invention to provide a method for generating a ring tone selected by a caller in a radio terminal.

It is further still another object of the present invention to provide a method for determining the identity of a caller upon hearing a ring tone in a radio terminal.

According to a first aspect of the present invention, a ring tone generating device includes a ring tone input device for receiving ring tones input from a user; a ring tone storage for storing the ring tones input from the ring tone input device; a ring tone generator for generating one of the ring tones stored in the ring tone storage, selected by the user, under the control of a controller; and the controller for generating the ring tone selected by the user through the ring tone generator, upon reception of an incoming call. Preferably, the ring tone is any one of a voice, music and a sound.

According to a second aspect of the present invention, a method for generating a ring tone in a radio terminal of a radio communication system including a database for storing the ring tone, includes the steps of: receiving a phone number of a radio terminal input by a user and a ring tone to be stored in the radio terminal of the input phone number; storing the input ring tone in the database in association with the input phone number of the radio terminal; calling the radio terminal and downloading the ring tone corresponding to the phone number of the radio terminal stored in the database to the radio terminal, when the radio terminal is in an idle state; storing the downloaded ring tone in the radio terminal; and generating the ring tone upon reception of an incoming call.

According to a third aspect of the present invention, a method for generating a ring tone in a radio terminal including a ring tone storage for storing a plurality of ring tones each having different ring tone numbers, includes the steps of: receiving an RF signal transmitted from a base station; analyzing the received RF signal to determine whether the RF signal contains data corresponding to the ring tone number for selecting the ring tone; and generating the ring tone corresponding to the ring tone number out of the ring tones stored in the ring tone storage, when the RF signal contains the data corresponding to the ring tone number.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will be described in detail hereinbelow with reference to the accompanying drawings.

Figure 1:
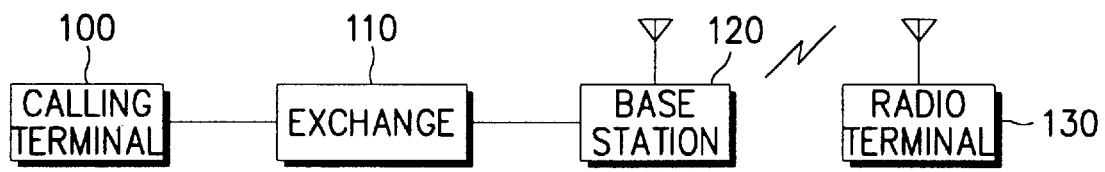
FIG. 1 is a block diagram of a common radio communication system.
Figure 2:
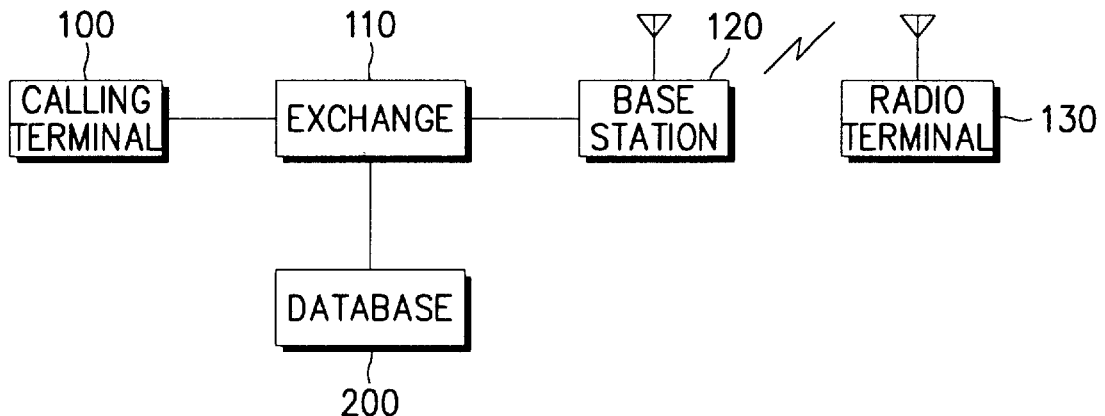
FIG. 2 is a block diagram of a radio communication system to which the present invention is applied.

Referring to FIG. 2, a radio communication system to which the present invention is applied includes a database 200 for providing various ring tones, in addition to the common radio communication system of FIG. 1. The database 200 according to the present invention stores the ring tones of, for example, music, sounds and voices input from the user in the specific storage areas corresponding to the phone numbers (or unique numbers) of the radio terminals. The exchange 110 then calls the radio terminal 130 and downloads the stored ring tones to the radio terminal 130, when the radio terminal 130 is in the idle state, not the busy state.

Reference will now be made to a method for storing the ring tones in the database 200, with reference to FIG. 2. First, the user dials a phone number (e.g., 555-1234) through the calling terminal 100 to connect with the database 200. The exchange 110 then establishes a communication path between the calling terminal 100 and the database 200 and sends the calling terminal 100 a message notifying the user (caller) to record the ring tone. For example, the message may be "Please press the phone number of the radio terminal for which you desire to record the ring tone and then input the ring tone to be recorded". At the sound of the message, the user will enter a phone number of the radio terminal 130 (e.g., 017-555-4567) through the calling terminal 100 and then input the ring tone that he desires to record. Here, the user may input his voice, his favorite music or other audible sounds as the ring tone through the calling terminal 100. The exchange 110 then stores in the database 200 the phone number of the radio terminal 130 input from the calling terminal 100 and the user input ring tone. That is, the exchange 110 stores in the database 200 the user input ring tone in association with the phone number of the radio terminal 130. Thereafter, the exchange 110 determines whether the radio terminal 130 is in the idle state or the busy state and enters a ring tone downloading mode when the radio terminal 130 is in the idle state. In the ring tone downloading mode, the exchange 110 calls the radio terminal 130 through the radio base station 120 and downloads the ring tone stored in the database 200 to the selected radio terminal 130.

Figure 3:
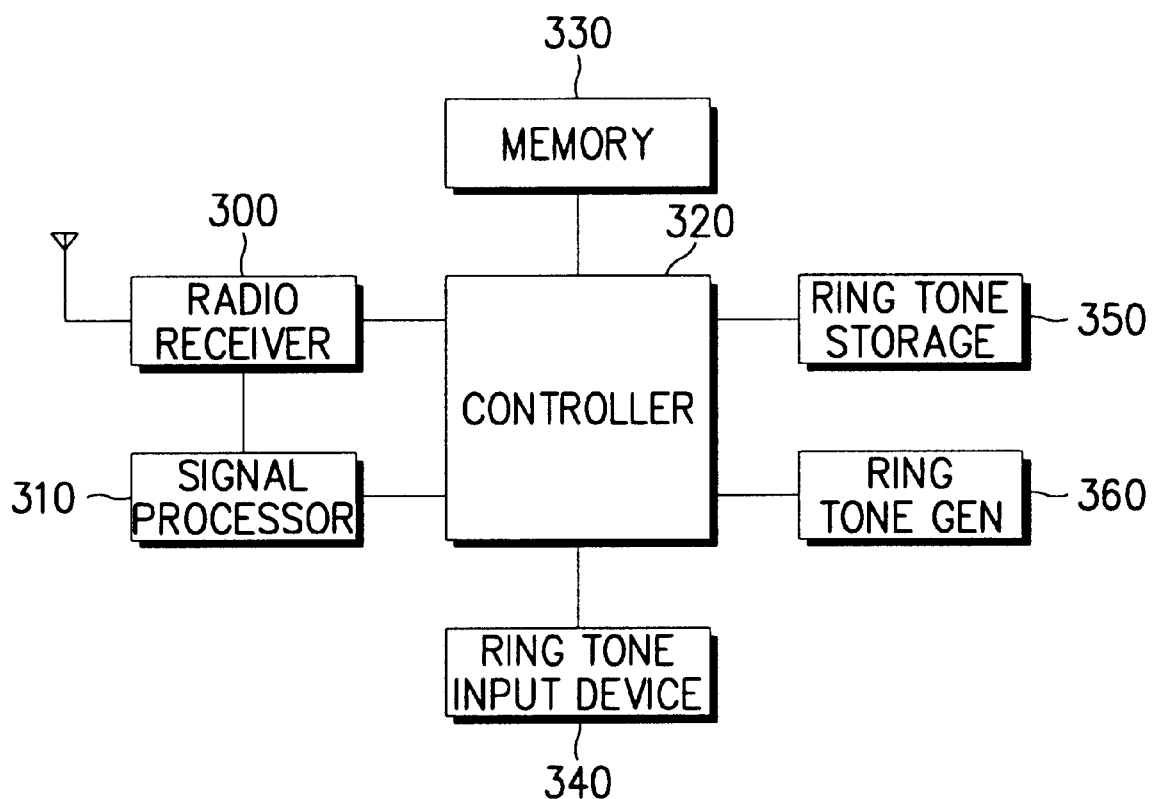
FIG. 3 is a block diagram of a ring tone generating device for a radio terminal according to an embodiment of the present invention.

Referring to FIG. 3, a ring tone generating device for the radio terminal according to the present invention includes a radio receiver 300, a signal processor 310, a controller 320, a memory 330, a ring tone input device 340, ring tone storage 350 and a ring tone generator 360.

Reference will now be made to operation of the ring tone generating device in the radio terminal 130, with reference to FIGS. 2 and 3. The radio receiver 300 is transfers an RF (Radio Frequency) signal received from the base station 120 through an antenna to a signal processor 310, which converts the received RF signal to a digital signal and transfers the digital signal to the controller 320. A controller 320 controls the overall operations of the radio terminal and determines whether the radio terminal 130 is called by analyzing the digital signal received from the signal processor 310. A memory 330 stores a control program for the controller 320 and stores data needed while executing the control program. Typically, the memory 330 includes a combination of read-only memory (ROM), random access memory (RAM) and electrically erasable read only memory (EEROM). The ring tone input device 340, which can be realized by a microphone, receives the ring tone that the user inputs.

The signal from the ring tone input device 340 is an analog signal which is converted into a digital signal by an analog to digital converter (not shown) within the controller 320. By using the ring tone input device 340, the user can input his favorite music, his voice or other sounds as the ring tone to be generated in the radio terminal 130. Further, as described above, when connected to the exchange 110 through the calling terminal 100, the user can register the desired ring tones in the database 200 and download the ring tones to the radio terminal 130 while the radio terminal 130 is in the idle state. The ring tone storage 350, which can be realized by a voice memory, stores the ring tones input by the user through the ring tone input device 340, or stores the ring tones downloaded from the database 200. Here, the ring tone storage 350 assigns identifying ring tone numbers to the respective ring tones. The ring tone generator 360, which may be realized by a speaker, generates a selected one of the ring tones stored in the ring tone storage 350 upon receipt of an incoming call, under the control of the controller 320.

Figure 4:
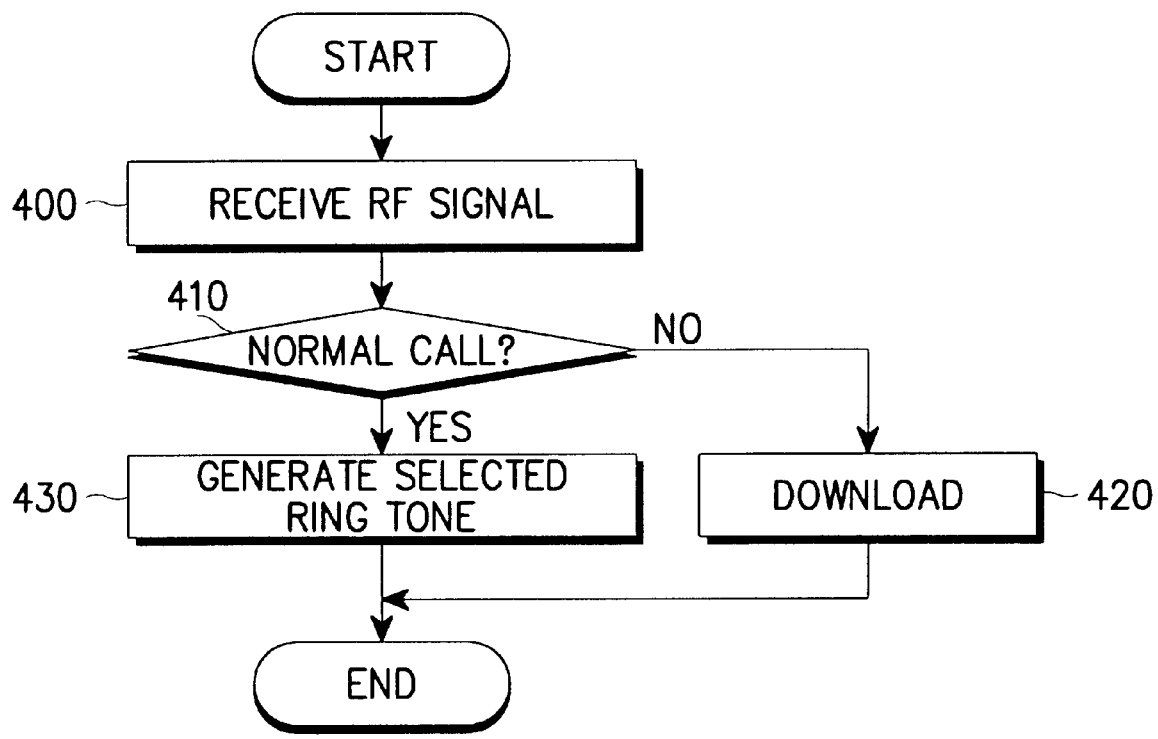
FIG. 4 is a flowchart illustrating a procedure for downloading the ring tones according to an embodiment of the present invention.

FIG. 4 is a flowchart illustrating the operation of the radio terminal 130 to download the ring tones stored in the database 200 by way of the radio base station 120.

Referring to FIGS. 2 to 4, the exchange 110 sends the phone number of the radio terminal 130 by way of the radio base station 120 in order to download the ring tone stored in the database 200 to the radio terminal 130. Further, the exchange 110 sends, via the radio base station 120, a signal inquiring whether the called radio terminal 130 is in the idle state and is in the ring tone downloading mode.

Specifically, in step 400, the controller 320 of the radio terminal 130 receives the RF signal transmitted from the base station 120 via the radio receiver 300. In step 410, the controller 320 analyzes the RF signal received from the radio base station 120 to determine whether the received RF signal is a normal call signal. If it is determined that the received RF signal is not the normal call signal, i.e., if it is determined that the RF signal is the ring tone downloading signal, the controller 320 downloads the ring tone stored in the database 200 through the base station 120 and stores the downloaded ring tone in the ring tone storage 350 (step 420).

When it is determined that the received RF signal is the normal call signal (step 410), the controller 320 controls the ring tone storage 350 to generate the selected ring tone through the ring tone generator 360 (step 430).

Figure 5:
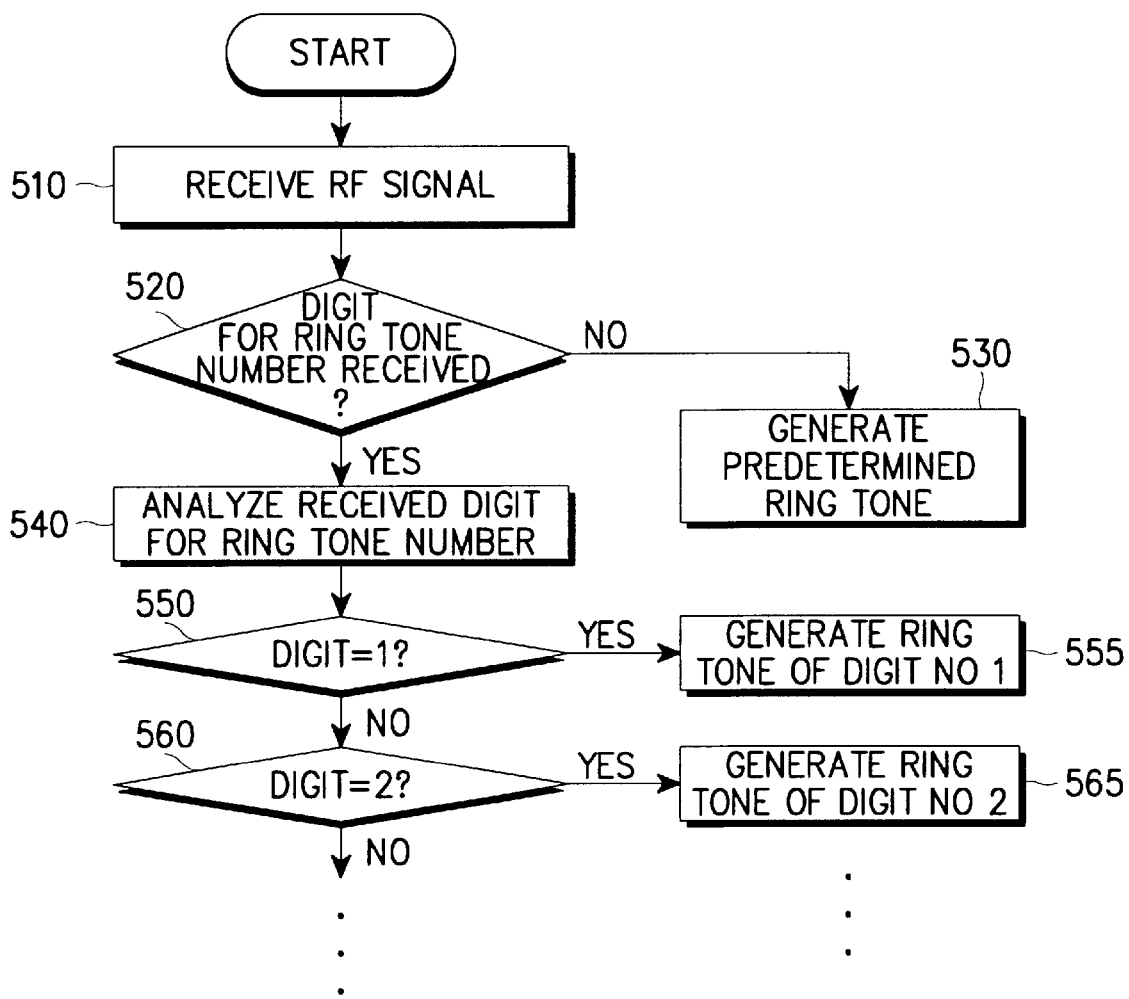
FIG. 5 is a flowchart illustrating a procedure for generating a ring tone selected by a caller according to an embodiment of the present invention.

FIG. 5 is a flowchart illustrating the operation of the radio terminal 130 while generating the ring tone selected by the calling party, wherein the generated ring tone corresponds to the ring tone number input by the calling party.

Referring to FIGS. 2 through 5, the radio terminal 130 downloads the ring tone stored in the database 200 or receives the ring tone input through the ring tone input device 340, and stores the various ring tones in the ring tone storage 350. It is assumed that the user of the radio terminal 130 has previously notified a calling party of the ring tone number for selecting a specific ring tone from the previously stored ring tones. Namely, the user assigns the different ring tone numbers to the respective calling parties, so that incoming calls from the respective calling parties initiate different ring tones, thereby identifying the calling party.

In other words, the radio terminal 130 assigns unique ring tone numbers to the respective ring tones stored in the ring tone storage 350. For example, a ring tone number 1 may denotes a first voice signal, a ring tone number 2 a first musical selection, a ring tone number 3 the sound of a musical instrument, a ring tone number 4 the sound of a frog, and a ring tone number 5 a second voice signal, etc. In this way, the different ring tone numbers may be assigned to the respective ring tones, and accessed by various callers.

In an embodiment of the present invention, it is assumed that the radio terminal 130 that the calling party attempts to call has the phone number "555-123-4567" and the ring tone number that the user of the radio terminal 130 has assigned to the calling party is "3". To call the radio terminal 130, the calling party successively inputs the phone number of the radio terminal 130 through the calling terminal 100 and the ring tone number assigned to himself( i.e., 555-123-4567-3).

The exchange 110 then transmits the phone number (555-123-4567) of the radio terminal 130 and the ring tone number (3) received from the calling terminal 100 to the radio terminal 130 via the radio base station 120.

In step 510, the controller 320 of the radio terminal 130 receives the RF signal transmitted from the base station 120 via the radio receiver 300. In step 520, the controller 320 analyzes the received RF signal to determine whether a digit for the ring tone number is received or not. If the digit for the ring tone number is not received, the controller 320 controls the ring tone generator 360 to generate a default ring tone preselected by the user (called party) (step 530). If a digit for the ring tone number is received, the controller 320 analyzes the received digit for the ring tone number in step 540.

If it is determined (step 550) that the received ring tone number is "1", the controller 320 controls the ring tone generator 360 to generate the ring tone with the ring tone number 1 out of the ring tones stored in the ring tone storage 350 (step 555). If the received ring tone number is not "1", the controller 320 then determines whether the received ring tone number is "2" (step 560). If the received ring tone number is "2", the controller 320 generates the ring tone with the ring tone number 2 out of the ring tones stored in the ring tone storage 350 by using the ring tone generator 360 (step 565). Similar steps are performed until the received ring tone number is identified.

By way of the above procedure, the radio terminal 130 performing the above stated example generates the ring tone corresponding to the ring tone number 3 input by the calling party out of the various ring tones stored in the ring tone storage 350, by using the ring tone generator 360. In this way, the user (called party) of the radio terminal 130 can perceive who the calling party is, upon hearing the ring tone generated.

As describe above, the user of the radio terminal inputs the desired ring tone, and then the radio terminal generates the ring tone input by the user upon reception of an incoming call. Further, by connecting with the database for storing the ring tones of the radio terminal and inputting the phone number of the radio terminal that he desires to call and a selected ring tone, the user can store in the database the ring tone in association with the phone number of the radio terminal and download the stored ring tone corresponding to the phone number of the radio terminal when the radio terminal is in the idle state. In addition, if the caller inputs the ring tone number preassigned with the called party, the called radio terminal generates the ring tone corresponding to the ring tone number input in the calling radio terminal, thereby a called party may identify a caller prior to answering the call by the sound of the ring tone generated.

While the present invention has been described in detail with reference to the specific embodiments, such embodiments are intended merely as exemplary applications of the invention. Thus, it is to be clearly understood that many variations can be made by one skilled in the art which are within the scope and spirit of the present invention as defined by the appended claims.

What is claimed is:

1. A radio communication system providing a selected one of a plurality of ring tones in response to an incoming call, comprising:

a radio terminal;

a database for storing the ring tones;

a calling terminal with which a user inputs a phone number of said radio terminal and a ring tone corresponding to the input phone number;

an exchange for storing said ring tone corresponding to the phone number of the radio terminal input from said calling terminal, for determining whether said terminal is in a ring tone downloading mode, and for downloading the ring tone stored in said database to said radio terminal in said ring tone downloading mode; and a base station connected to said exchange, for calling the radio terminal under the control of the exchange and downloading said ring tone to the radio terminal, in the ring tone downloading mode.

2. The radio communication system as claimed in claim 1, wherein said radio terminal stores the downloaded ring tone and generates said downloaded ring tone by selection of the user upon reception of an incoming call.

3. A device for generating a ring tone in a radio terminal, comprising:

a ring tone input device for receiving default ring tones input from a radio terminal user;

a ring tone storage for storing the default ring tones input from said ring tone input device and for assigning identifying ring tone numbers to the respective ring tones;

a ring tone generator for generating one of said default ring tones stored in said ring tone storage; and a controller, said controller generating the default ring tone selected by the radio terminal user through said ring tone generator, upon reception of an incoming call if another ring tone is not selected.

4. The device as claimed in claim 3, wherein said ring tone is any one of a voice, music and a sound.

5. A method for generating a ring tone in a radio terminal of a radio communication system including a database for storing the ring tone, comprising the steps of:

receiving a phone number of a radio terminal input by a calling terminal and a ring tone to be stored in the radio terminal of the input phone number;

storing the input ring tone in said database corresponding to the input phone number of the radio terminal;

calling said radio terminal;

determining whether said terminal is in an idle state using an exchange connected to a base station;

downloading the ring tone corresponding to the phone number of the radio terminal stored in said database to said radio terminal, when said radio terminal is in said idle state;

storing said downloaded ring tone in said radio terminal; and generating said ring tone upon reception of an incoming call.

6. The method as claimed in claim 5, wherein said ring tone is any one of a voice, music and a sound.

* * * * *